United States Patent
Fuehrer

(10) Patent No.: US 9,466,214 B2
(45) Date of Patent: Oct. 11, 2016

(54) METHOD AND DEVICE FOR SUPPLYING A COLLISION SIGNAL PERTAINING TO A VEHICLE COLLISION, A METHOD AND DEVICE FOR ADMINISTERING COLLISION DATA PERTAINING TO VEHICLE COLLISIONS, AS WELL AS A METHOD AND DEVICE FOR CONTROLLING AT LEAST ONE COLLISION PROTECTION DEVICE OF A VEHICLE

(71) Applicant: Robert Bosch GmbH, Stuttgart (DE)

(72) Inventor: Thomas Fuehrer, Stuttgart-Weilimdorf (DE)

(73) Assignee: ROBERT BOSCH GMBH, Stuttgart (DE)

( * ) Notice: Subject to any disclaimer, the term of this patent is extended or adjusted under 35 U.S.C. 154(b) by 0 days.

(21) Appl. No.: 14/338,144

(22) Filed: Jul. 22, 2014

(65) Prior Publication Data

US 2015/0032372 A1    Jan. 29, 2015

(30) Foreign Application Priority Data

Jul. 23, 2013  (DE) .................. 10 2013 214 383

(51) Int. Cl.
| G08G 1/16 | (2006.01) |
| G01C 21/20 | (2006.01) |
| G08G 1/00 | (2006.01) |
| G07C 5/00 | (2006.01) |

(52) U.S. Cl.
CPC .............. *G08G 1/16* (2013.01); *G01C 21/20* (2013.01); *G07C 5/008* (2013.01); *G08G 1/205* (2013.01)

(58) Field of Classification Search
CPC ........ G01C 21/20; G08G 1/16; G08G 1/205; G07C 5/008
USPC .......................................................... 701/515
See application file for complete search history.

(56) References Cited

U.S. PATENT DOCUMENTS

| 5,835,008 | A | * | 11/1998 | Colemere, Jr. | ........ | B60Q 1/441 340/439 |
| 6,741,168 | B2 | | 5/2004 | Webb et al. | | |
| 7,421,334 | B2 | * | 9/2008 | Dahlgren | ............... | G01C 21/26 340/989 |
| 7,710,248 | B2 | * | 5/2010 | Greene | .................. | G08G 1/166 340/436 |
| 8,594,919 | B2 | * | 11/2013 | Munakata | .............. | G01C 21/26 701/300 |
| 8,924,139 | B2 | * | 12/2014 | Louis | ...................... | G08G 5/06 701/301 |
| 8,988,252 | B2 | * | 3/2015 | Scholl | ...................... | G08G 1/04 340/539.25 |
| 9,043,131 | B2 | * | 5/2015 | Carlson | ............... | B61L 15/0027 340/436 |
| 9,159,234 | B2 | * | 10/2015 | Dirndorfer | ........ | G01M 17/0078 |
| 9,178,995 | B2 | * | 11/2015 | Costa | .................... | G10L 15/265 |
| 2002/0105423 | A1 | * | 8/2002 | Rast | ...................... | G08G 1/162 340/479 |
| 2003/0112133 | A1 | | 6/2003 | Webb et al. | | |
| 2004/0102984 | A1 | * | 5/2004 | Wahlbin | ................ | G06Q 40/08 705/4 |

(Continued)

FOREIGN PATENT DOCUMENTS

DE    60 2004 007 083    2/2008

*Primary Examiner* — Atul Trivedi
(74) *Attorney, Agent, or Firm* — Norton Rose Fulbright US LLP

(57) ABSTRACT

A method for supplying a collision signal pertaining to a vehicle collision includes: generating a collision signal that represents at least one characteristic of a collision involving at least one crashed vehicle and position data of the collision, using collision-relevant sensor data of the crashed vehicle; and outputting the collision signal via an interface to a central collision data administration device.

12 Claims, 3 Drawing Sheets

(56) References Cited

U.S. PATENT DOCUMENTS

| | | | |
|---|---|---|---|
| 2004/0102985 A1* | 5/2004 | Wahlbin | G06Q 40/08 705/4 |
| 2004/0103004 A1* | 5/2004 | Wahlbin | G06Q 40/08 705/4 |
| 2004/0103005 A1* | 5/2004 | Wahlbin | G06Q 40/08 705/4 |
| 2004/0103006 A1* | 5/2004 | Wahlbin | G06Q 40/08 705/4 |
| 2004/0103007 A1* | 5/2004 | Wahlbin | G06Q 40/08 705/4 |
| 2004/0103008 A1* | 5/2004 | Wahlbin | G06Q 40/02 705/4 |
| 2004/0103009 A1* | 5/2004 | Wahlbin | G06Q 40/02 705/4 |
| 2004/0103010 A1* | 5/2004 | Wahlbin | G06Q 40/08 705/4 |
| 2004/0111301 A1* | 6/2004 | Wahlbin | G06Q 40/08 705/4 |
| 2005/0033516 A1* | 2/2005 | Kawasaki | B60R 21/013 701/301 |
| 2005/0073433 A1* | 4/2005 | Gunderson | B60Q 9/006 340/903 |
| 2005/0080565 A1 | 4/2005 | Olney | |
| 2005/0209770 A1* | 9/2005 | O'Neill | G06Q 10/06 701/117 |
| 2007/0032952 A1* | 2/2007 | Carlstedt | B60R 21/0134 701/301 |
| 2007/0174467 A1* | 7/2007 | Ballou | H04L 63/0838 709/227 |
| 2008/0165029 A1* | 7/2008 | Fu | B60Q 9/008 340/903 |
| 2010/0030540 A1* | 2/2010 | Choi | G06Q 40/08 703/8 |
| 2010/0114467 A1* | 5/2010 | Samuel | G08G 1/164 701/119 |
| 2010/0145618 A1* | 6/2010 | Lin | G08G 1/161 701/301 |
| 2012/0016581 A1* | 1/2012 | Mochizuki | G08G 1/161 701/301 |
| 2012/0092187 A1 | 4/2012 | Scholl et al. | |
| 2012/0146812 A1* | 6/2012 | Ruy | G08G 1/164 340/905 |
| 2012/0283895 A1* | 11/2012 | Noda | G08G 1/166 701/1 |
| 2012/0296562 A1* | 11/2012 | Carlson | B61L 15/0027 701/301 |
| 2012/0330542 A1* | 12/2012 | Hafner | G08G 1/163 701/301 |
| 2013/0060401 A1* | 3/2013 | Hahne | G08G 1/166 701/2 |
| 2013/0069773 A1* | 3/2013 | Li | B60K 28/02 340/426.1 |
| 2013/0144520 A1* | 6/2013 | Ricci | G06F 9/54 701/301 |
| 2013/0151088 A1* | 6/2013 | Ricci | G06F 17/00 701/51 |
| 2013/0311641 A1* | 11/2013 | Chow | G08G 1/04 709/224 |
| 2014/0032094 A1* | 1/2014 | Heinrichs-Bartscher | B60T 7/22 701/301 |
| 2014/0049406 A1* | 2/2014 | Shin | G08G 1/096791 340/905 |
| 2015/0032362 A1* | 1/2015 | Goudy | G08G 1/166 701/301 |

* cited by examiner

ND DEVICE FOR SUPPLYING A
COLLISION SIGNAL PERTAINING TO A
VEHICLE COLLISION, A METHOD AND
DEVICE FOR ADMINISTERING COLLISION
DATA PERTAINING TO VEHICLE
COLLISIONS, AS WELL AS A METHOD AND
DEVICE FOR CONTROLLING AT LEAST
ONE COLLISION PROTECTION DEVICE OF
A VEHICLE

BACKGROUND OF THE INVENTION

1. Field of the Invention

The present invention relates to a method for supplying a collision signal pertaining to a vehicle collision, a device for supplying a collision signal pertaining to a vehicle collision, a method for administering collision data pertaining to vehicle collisions, a device for administering collision data pertaining to vehicle collisions, a method for controlling at least one collision protection device of a vehicle, a device for controlling at least one collision protection device of a vehicle, and to a corresponding computer program product.

2. Description of the Related Art

Collisions involving vehicles can be a frequent occurrence in road traffic, especially in the area of intersections. The published German patent publication DE 60 2004 007 083 T2 discloses a driver-adaptive collision warning system, which outputs collision warnings at individualized instants in response to the behavior or attitude classification of an individual driver.

BRIEF SUMMARY OF THE INVENTION

Against this background, an improved method for supplying a collision signal pertaining to a vehicle collision, an improved device for supplying a collision signal pertaining to a vehicle collision, an improved method for administering collision data pertaining to vehicle collisions, an improved device for administering collision data pertaining to vehicle collisions, an improved method for controlling at least one collision protection device of a vehicle, an improved device for controlling at least one collision protection device of a vehicle, and an improved computer program product are provided.

According to specific embodiments of the present invention, information in particular about a collision that has already taken place at a collision location is able to be made available for use and/or to be used to prepare a vehicle for a looming or potential collision at the collision location. Specifically, information about collisions that have already occurred at collision locations such as intersections may be compiled on the server side, statistically analyzed and utilized on the vehicle side. For example, Cloud-based collision data statistics can be generated, which may be used to prepare vehicles for looming or potential collisions.

Specific embodiments of the present invention advantageously make it possible, for example, to avoid collisions or to reduce the consequences of a collision and/or to obtain meaningful accident data statistics that are able to be utilized to avoid collisions or to reduce the consequences of a collision. Using a multitude of data, or through statistics, in particular, a probable impact and/or a severity of the impact are/is predictable in a Cloud-based manner. Safety systems or pre-crash systems available on the vehicle side, for example, are able to make the most likely best protective adjustments possible, or are able to be adapted to a looming collision in an optimal manner as a function of the server-based collision data. Safety-relevant measures of vehicles in preparation for a collision can therefore be improved. Specific embodiments of the present invention are suitable in particular for a combination with a driver assistance system for collision detection, the safety systems being adjustable more accurately in the event of a looming collision, but they are also suitable for an autonomous use, the safety systems being adjustable in a preventive manner as a function of the collision data. It is furthermore possible, for example, to make such Cloud-based accident data available to governments or traffic authorities so that constructive optimizations can be undertaken.

A method for supplying a collision signal pertaining to a vehicle collision includes the following steps:

Generating a collision signal that represents at least one characteristic of a collision involving at least one crashed vehicle as well as position data of the collision, using collision-relevant sensor data of the crashed vehicle; and outputting the collision signal to an interface to a central collision data administration device.

The method is able to be executed in conjunction with corresponding devices of a crashed vehicle. In this context a vehicle means a motor vehicle, especially a road-bound motor vehicle such as a passenger car, a truck or some other commercial vehicle. The collision-relevant sensor data may represent data supplied by a sensor, or data supplied by a sensor and preprocessed. The method may include a step of reading in the sensor data from an interface to a collision sensor or a collision-relevant sensor, or from an interface to a preprocessing device. The crashed vehicle may be equipped with the at least one collision sensor or collision-relevant sensor. The collision sensor may be an acceleration sensor, a pressure sensor, a position sensor and/or the like. The at least one characteristic of the collision could be a physical characteristic, especially information about the type of collision, the severity of the collision, and/or at least one further collision characteristic. The collision data administration device may be a central server device, especially a Cloud-based database or a so-called Cloud server or the like. The position data of the collision represent a geographical position of a collision that has occurred. In particular, the geographical position may lie in a region of a road intersection.

According to one specific embodiment, in the step of generating, the collision signal may be generated using sensor data that represent a speed of the crashed vehicle, an acceleration of the crashed vehicle, an orientation of the crashed vehicle in relation to a road, a geographical position of the crashed vehicle and, additionally or alternatively, impact information about an impact position, an impact angle and, additionally or alternatively, an impact speed at the crashed vehicle. Such a specific embodiment offers the advantage that comprehensive as well as meaningful information for the precise characterization of a collision is able to be furnished.

A method for administering collision data pertaining to vehicle collisions includes the following steps:

Reading in a collision signal that represents at least one characteristic of a collision involving at least one crashed vehicle and position data of the collision;

storing a server-stored collision data set that is able to be made available to vehicles, based on the read-in collision signal.

The method is able to be executed in conjunction with a central administration device or a collision data administration device. The method is also able to be executed in conjunction with a specific embodiment of the aforementioned method of supplying, the collision signal being able to be provided with the aid of a specific embodiment of the aforementioned method of supplying. The collision data set may include processed, conditioned or adapted collision-relevant data from the collision signal. The collision data set may be developed to be retrievable and usable by devices of vehicles.

According to one specific embodiment, a step of combining the read-in collision signal with at least one item of surroundings information of the collision and, additionally or alternatively, an evaluation parameter for the collision may be provided. The collision data set stored in the step of storing may include the at least one item of surroundings information of the collision and, alternatively or additionally, the evaluation parameter for the collision. The surroundings information may include information, related to the collision location and the collision instant, with regard to weather conditions, a road condition and, additionally or alternatively, similar information. The evaluation parameter may be a weighting parameter that is a function of at least one characteristic of the collision and, additionally or alternatively, a selectable criterion. Such a specific embodiment offers the advantage that collision data sets that enable a very comprehensive, meaningful and precise characterization of a collision are able to be held in readiness.

In particular, it is possible to execute the step of reading in and the step of storing multiple times in order to read in a plurality of collision signals and to store at least one collision data set. A collision data set may be based on at least one collision signal. Such a specific embodiment offers the advantage that a comprehensive data compilation is able to be prepared from a plurality of collision signals in order to cover a meaningful number of collision types and/or collision locations, in particular.

In the step of storing, a first collision signal and a second collision signal are able to be combined given matching position data of the collision and, alternatively or additionally, given at least one matching characteristic of the collision, in order to generate a shared collision data set. Also, in the step of storing, a multitude of collision signals is able to be combined given matching position data of the collision and, alternatively or additionally, given at least one matching characteristic of the collision, in order to generate a shared collision data set. In other words, at least two collision signals are able to be grouped as a function of position data and, additionally or alternatively, a collision characteristic, so that a shared collision data set can be generated. Such a specific development offers the advantage that a position-related and/or characteristic-related statistical acquisition of collisions and the use of the statistical data are realizable.

Furthermore, a step of supplying a collision data set for transmission to an interface to at least one receiving device on the vehicle side, in particular in response to a retrieval signal of the at least one vehicle-side receiving device, may be provided. The receiving device may be part of a device that is permanently installed in the vehicle or part of a device disposed in the vehicle, which is able to be detached or removed. It is possible that the receiving device is connected to the at least one collision protection device and/or a driver assistance system for a signal exchange. Such a specific embodiment offers the advantage that this type of supplied collision data set may be used for many different functions or purposes in order to minimize the effects of a collision.

A method for controlling at least one collision protection device includes the following steps:

Retrieving a collision data set which represents at least one characteristic of a collision involving at least one crashed vehicle and position data of the collision, for current position data of the vehicle; and Generating at least one adjustment parameter for controlling the at least one collision protection device using the at least one characteristic of the collision from the retrieved collision data set.

The method may be executed in conjunction with a collision protection device of a vehicle. The method is also able to be executed in conjunction with a specific embodiment of the aforementioned method for administering, the collision data set being storable so as to be made available, with the aid of a specific embodiment of the aforementioned method for administering. The at least one collision protection device may include at least one airbag, at least one belt tightener, an adaptive crash structure, and/or at least one further safety means for protecting vehicle occupants and other road users or parties involved in the collision. The collision data set may be retrieved from a server-based collision data administration device. In the step of retrieving, at least one collision data set is able to be retrieved from the collision data administration device and utilized in the step of generating. In addition, multiple collision data sets may be retrieved from the collision data administration device and buffer-stored on the vehicle side. At least one of the buffer-stored collision data sets is able to be used in the step of generating.

According to one specific embodiment, at least one adjustment parameter may be generated in the step of generating, which is developed to induce a preadjustment of the at least one collision protection device with regard to the at least one characteristic of the collision from the retrieved collision data set. Such a specific embodiment offers the advantage that such a pre-parameterization of the at least one collision protection device is able to maximize a protective effect of the at least one collision protection device, in that an optimal preparation for a looming collision is able to take place.

Also, in the generating step, at least one adjustment parameter may be generated, which is developed to induce an output of a warning signal to occupants of the vehicle with regard to a collision danger at a position designated by the position data from the collision data set. The warning signal may be output in optical, acoustic and/or haptic form. Such a specific embodiment offers the advantage that an advance warning of a collision danger may take place as well, so that vehicle occupants are able to carry out protective reactions or may also act preventively in order to reduce a risk.

A device for supplying a collision signal pertaining to a vehicle collision includes the following features:

a device for generating a collision signal that represents at least one characteristic of a collision involving at least one crashed vehicle and position data of the collision, using collision-relevant sensor data of the crashed vehicle; and a device for outputting the collision signal to an interface to a central collision data administration device.

The aforementioned device may advantageously be used in conjunction with a specific embodiment of the method for supplying. The device is developed to carry out or implement the steps of the method for supplying in appropriate devices. This embodiment variant of the present invention in the form of a device may likewise quickly and efficiently achieve the object on which the present invention is based.

In the case at hand, a device describes an electrical device, especially a control device, which processes sensor data and outputs a collision signal as a function thereof. The device may include an interface developed as hardware and/or software. In a hardware implementation, the interfaces may be part of a so-called system ASIC, for instance, which encompasses a wide variety of functionalities of the device. However, it is also possible for the interfaces to be self-contained, integrated switching circuits or to be at least partially made up of discrete components. In a software design, the interfaces may be software modules, which are provided in a microcontroller in addition to other software modules, for example.

A method for administering collision data pertaining to vehicle collisions has the following features:

a device for reading in a collision signal that represents at least one characteristic of a collision involving at least one crashed vehicle and position data of the collision;

a device for storing a server-stored collision data set that is able to be made available to vehicles, based on the read-in collision signal.

The aforementioned device may advantageously be used in conjunction with a specific embodiment of the method for administering. The device is developed to carry out or implement the steps of the method for administering in appropriate devices. This embodiment variant of the present invention in the form of a device may likewise be used to quickly and efficiently achieve the object on which the present invention is based.

A device for controlling at least one collision protection device of a vehicle includes the following features:

a device for retrieving a collision data set which represents at least one characteristic of a collision involving at least one crashed vehicle and position data of the collision, for current position data of the vehicle; and a device for generating at least one adjustment parameter for controlling the at least one collision protection device using the at least one characteristic of the collision from the retrieved collision data set.

The aforementioned device may advantageously be used in conjunction with a specific embodiment of the method for controlling. The device is developed to carry out or implement the steps of the method for controlling in appropriate devices. This embodiment variant of the present invention in the form of a device may likewise be used to quickly and efficiently achieve the object on which the present invention is based.

In the case at hand, a device describes an electrical device, especially a control device, which processes collision data sets and outputs adjustments parameters as a function thereof. The device may include an interface developed as hardware and/or software. In a hardware implementation, the interfaces may be part of a so-called system ASIC, for instance, which encompasses a wide variety of functionalities of the device. However, it is also possible for the interfaces to be self-contained, integrated switching circuits or to be at least partially made up of discrete components. In a software design, the interfaces may be software modules, which are provided in a microcontroller in addition to other software modules, for example.

Also advantageous is a computer program product having program code, which is stored on a machine-readable carrier such as a semiconductor memory, a hard-disk memory or an optical memory, and is used to implement an aforementioned method for supplying, an aforementioned method for administering and, additionally or alternatively, an aforementioned method for controlling when the program is running on a computer or a device.

DETAILED DESCRIPTION OF THE INVENTION

Figure 1:
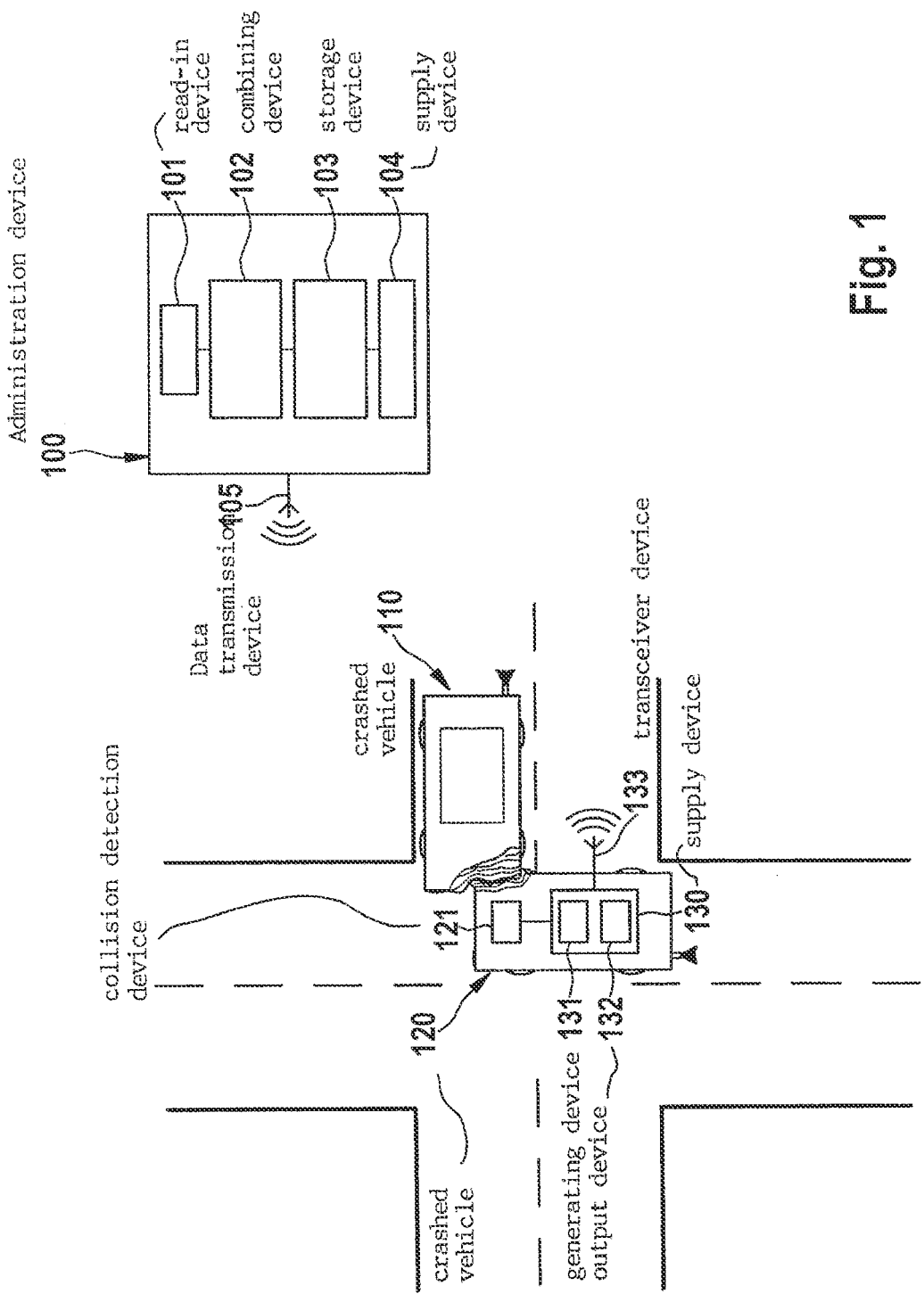
FIG. 1 a schematic representation of a device for administering collision data according to one exemplary embodiment of the present invention, and a vehicle having a device for supplying a collision signal according to one exemplary embodiment of the present invention.

In the subsequent description of preferred exemplary embodiments of the present invention, the same or similar reference numerals are used for the elements that are shown in the various figures and act similarly, a repeated description of these elements having been omitted.

FIG. 1 shows a schematic representation of a device for administering collision data pertaining to vehicle collisions according to an exemplary embodiment of the present invention, and a crashed vehicle having a device for supplying a collision signal pertaining to a vehicle collision, according to an exemplary embodiment of the present invention. Shown are the device for administering collision data or the collision data administration device, i.e., administration device 100, a read-in device 101, a combining device 102, a storage device 103, a supply device 104, a data transmission device 105, a crashed other vehicle 110, crashed vehicle 120, merely by way of example, a collision detection device 121, the device for supplying a collision signal or the collision signal supply device. i.e., supply device 130, a generating device 131, an output device 132, and a transceiver device 133.

Crashed other vehicle 110 and crashed vehicle 120 are shown on a road, e.g., in the region of an intersection. Crashed other vehicle 110 and crashed vehicle 120 have collided with each other in the region of the intersection.

Crashed vehicle 120 has collision detection device 121 and supply device 130. Supply device 130 includes generating device 131, output device 132, and transceiver device 133.

Generating device 131 is developed to generate a collision signal using collision-relevant sensor data of crashed vehicle 100 supplied by means of collision detection device 121. The collision signal represents at least one characteristic of the collision involving crashed vehicle 120 and position data of the collision. Output device 132 is designed to output the generated collision signal to an interface to administration device 100 by means of transceiver device 133.

According to one specific embodiment, generating device 131 is developed to generate the collision signal with the aid of sensor data supplied by means of collision detection device 121, the sensor data representing a speed of crashed vehicle 120, an acceleration of crashed vehicle 120, an orientation of crashed vehicle 120 in relation to the road, a geographical position of crashed vehicle 120 and/or impact information about an impact position, an impact angle and/or an impact speed at crashed vehicle 120.

Administration device 100 is situated at a location remote from crashed other vehicle 110 and crashed vehicle 120, even if this is not explicitly shown in FIG. 1. Administration device 100 has read-in device 101, combining device 102, storage device 103, supply device 104 as well as data transmission device 105. Read-in device 101 is developed to read in the collision signal that represents at least one characteristic of the collision involving at least crashed vehicle 120 and position data of the collision. Storage device 103 is designed to store, based on the read-in collision signal, a server-stored collision data set able to be made available to vehicles.

According to the described exemplary embodiment of the present invention, shown in FIG. 1, administration device 100 also includes combining device 102 and supply device 104 as well as data transmission device 105. Combining device 102 is designed to combine the read-in collision signal with at least one item of surroundings information of the collision and/or an evaluation parameter for the collision. Storage device 103 is designed to store, based on the collision signal combined with the item of surroundings information and/or evaluation parameters, the server-stored collision data set able to be made available to vehicles. Supply device 104 is developed to transmit the collision data set by means of data transmission device 105 to an interface to at least one receiving device on the vehicle side. Supply device 104 is set up to transmit the collision data set in response to a retrieval signal of the at least one receiving device on the vehicle side.

According to one exemplary embodiment, read-in device 101 is designed to read in a plurality of collision signals, and storage device 103 is designed to store at least one collision data set. According to one exemplary embodiment, storage device 103 is designed to combine a first collision signal and a second collision signal, given matching position data of the collision and/or given at least one matching characteristic of the collision, in order to generate a shared collision data set. According to one exemplary embodiment, crashed other vehicle 110 includes another supply device similar to supply device 130.

Figure 2:
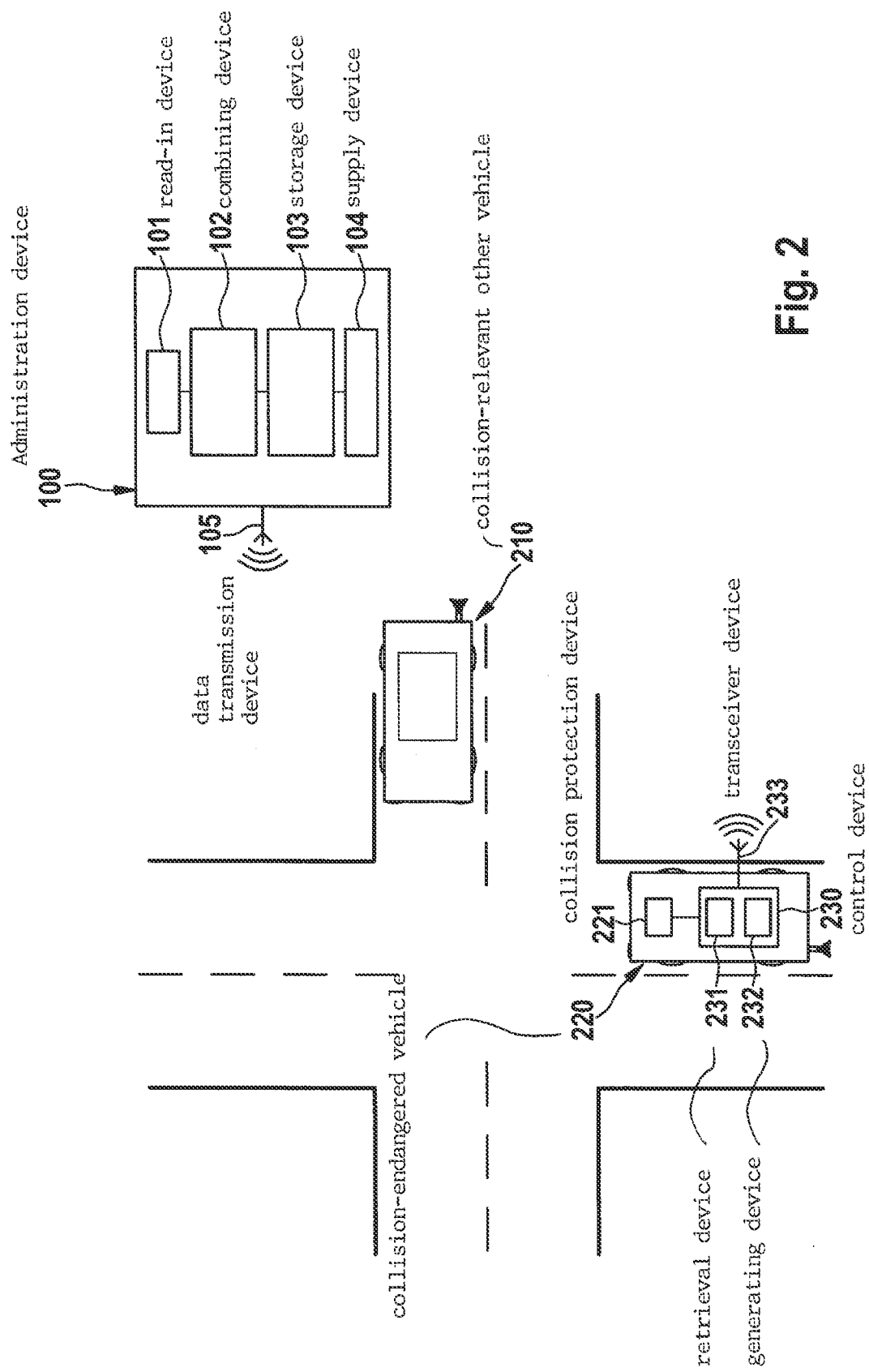
FIG. 2 a schematic representation of a device for administering collision data according to one exemplary embodiment of the present invention, and a vehicle having a device for controlling at least one collision protection device of a vehicle according to one exemplary embodiment of the present invention.

FIG. 2 shows a schematic representation of the device for administering collision data from FIG. 1, and a collision-endangered vehicle having a device for controlling at least one collision protection device of a vehicle according to an exemplary embodiment of the present invention. Shown are the device for administering collision data or the collision data administration device, i.e., administration device 100, read-in device 101, a combining device 102, storage device 103, supply device 104, data transmission device 105, a collision-relevant other vehicle 210, collision-endangered vehicle 220, merely by way of example, a collision protection device 221, the device for controlling the at least one collision protection device or control device 230, a retrieval device 231, a generating device 232, and a transceiver device 233.

Collision-relevant other vehicle 210 and collision-endangered vehicle 220 are shown on a road, e.g., in the region of an intersection. The road or intersection is that from FIG. 1. Collision-relevant other vehicle 210 and collision-endangered vehicle 220 are at risk of colliding with each other in the region of the intersection.

Collision-endangered vehicle 220 is equipped with collision detection device 221 and control device 230. According to one exemplary embodiment, collision-endangered vehicle 220 also has the collision detection device and the supply device from FIG. 1. Control device 230 has retrieval device 231, generating device 232 and transceiver device 233. Retrieval device 231 is designed to retrieve from administration device 100, with the aid of transceiver device 233, a collision data set that represents at least one characteristic of a collision involving at least one crashed vehicle and position data of the collision, for current position data of collision-endangered vehicle 220. In particular, retrieval device 231 is designed to retrieve from administration device 100 the collision data set that represents at least one characteristic of the collision involving the crashed vehicle from FIG. 1 and position data of the collision, for current position data of collision-endangered vehicle 220. Generating device 232 is designed to generate from the retrieved collision data set at least one adjustment parameter for controlling collision protection device 221, using the at least one characteristic of the collision.

According to an exemplary embodiment, generating device 232 is designed to generate at least one adjustment parameter, which is developed to induce a preadjustment of collision protection device 221 with regard to the at least one characteristic of the collision from the retrieved collision data set. According to one exemplary embodiment, generating device 232 is designed to generate at least one adjustment parameter, which is developed to induce an output of a warning signal to occupants of collision-endangered vehicle 220 with regard to a collision danger at the position designated by the position data from the collision data set. According to one exemplary embodiment, collision-relevant other vehicle 210 has a further supply device like the supply device from FIG. 1 and a further control device like control device 230.

Figure 3:
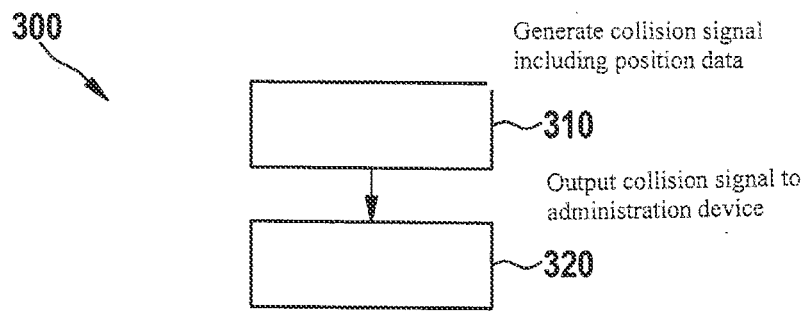
FIG. 3 a flow chart of a method for supplying a collision signal according to one exemplary embodiment of the present invention.

FIG. 3 shows a flow chart of a method 300 for providing a collision signal pertaining to a vehicle collision, according to an exemplary embodiment of the present invention. Method 300 is advantageously able to be carried out in conjunction with a device for supplying a collision signal pertaining to a vehicle collision and with a device for administering collision data pertaining to vehicle collisions, such as the supply device and the administration device from FIG. 1. Method 300 has a step 310 of generating a collision signal that represents at least one characteristic of a collision involving at least one crashed vehicle and position data of the collision, using collision-relevant sensor data of the crashed vehicle. In addition, method 300 has a step 320 of outputting the collision signal to an interface to a central collision data administration device.

Figure 4:
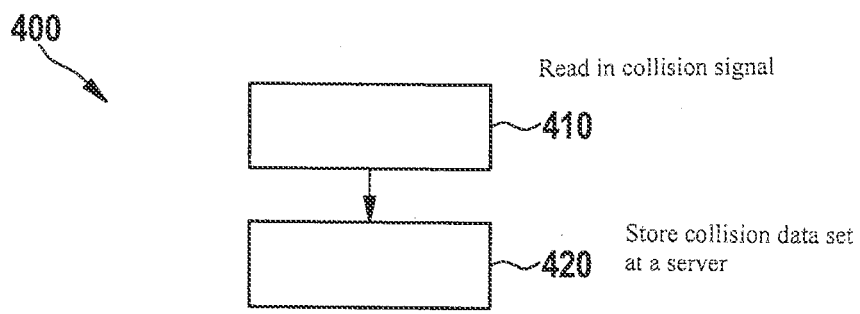
FIG. 4 a flow chart of a method for administering collision data according to one exemplary embodiment of the present invention.

FIG. 4 shows a flow chart of a method 400 for administering collision data pertaining to vehicle collisions, according to one exemplary embodiment of the present invention. Method 400 is advantageously able to be carried out in conjunction with a method such as the method for supplying a collision signal pertaining to a vehicle collision from FIG. 3. Method 400 is also advantageously executable in conjunction with a device for administering collision data pertaining to vehicle collisions, such as the administration device from FIG. 1 or FIG. 2. Method 400 has a step 410 of reading in a collision signal that represents at least one characteristic of a collision involving at least one crashed vehicle and position data of the collision. Method 400 furthermore includes a step 420 of storing a server-stored collision data set able to be made available to vehicles, based on the read-in collision signal.

Figure 5:
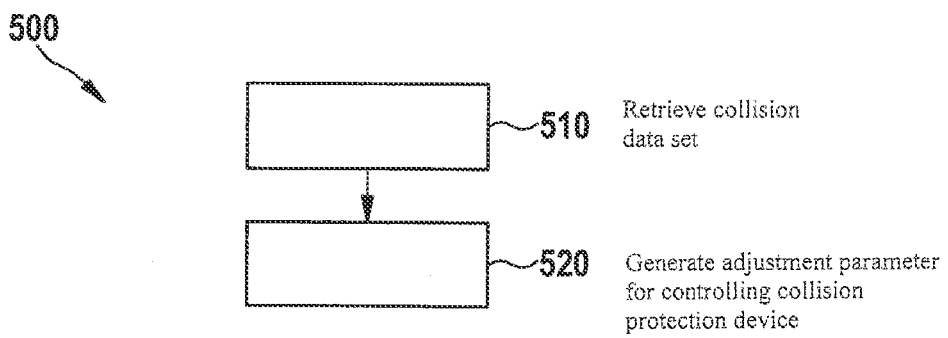
FIG. 5 a flow chart of a method for controlling at least one collision protection device of a vehicle according to an exemplary embodiment of the present invention.

FIG. 5 shows a flow chart of a method 500 for controlling at least one collision protection device of a vehicle, in accordance with one exemplary embodiment of the present invention. Method 500 is advantageously able to be carried out in conjunction with a method such as the method for administering collision data pertaining to vehicle collisions from FIG. 4. Method 500 is advantageously also able to be carried out in conjunction with a device for controlling at least one collision protection device of a vehicle and a device for administering collision data pertaining to vehicle collisions, such as the control device and the administration device from FIG. 2. Method 500 has a step 510 of retrieving a collision data set that represents at least one characteristic of a collision involving at least one crashed vehicle and position data of the collision, for current position data of the vehicle. In addition, method 500 has a step 520 of generating at least one adjustment parameter for controlling the at least one collision protection device using the at least one characteristic of the collision from the retrieved collision data set.

With reference to FIGS. 1 through 5, a concept for preparing collision protection devices or pre-crash systems in the event of looming intersection accidents with the aid of Cloud-based collision data according to exemplary embodiments of the present invention will be described in the following text in the form of a summary and in other words.

To begin with, features are discussed that crashed vehicle 120, collision-endangered vehicle 220, crashed other vehicle 110 and collision-relevant other vehicle 210 may possess. For example, "Cloud computing" means that a part of the IT landscape, in this connection especially the hardware such as the computing center, data memory as well as the software of administration device 100, is no longer operated on its own on the user side or provided at the local level, but is leased as a service from one or more provider(s), which generally is/are located at a remote geographical location. Applications and data are then no longer stored on a local computer but in the "cloud". For example, the position data are acquired and supplied in the form of GPS coordinates, via a navigation system, smartphone or the like. A data exchange between administration device 100 or the Cloud server and supply device 130 or control device 230 is accomplished by means of a data link via a navigation system, a smartphone or the like, for example. Also, in particular a so-called eCall system or an assistance system for sending electronic messages following an accident is provided on the vehicle side. Optionally, for example, a driver assistance system such as a so-called intersection assistant having front sensors and/or side sensors is provided on the vehicle side, which, for example, monitors lateral traffic at intersections with the aid of radar technology. Furthermore, pre-crash systems or at least one collision protection device 221, for instance, are provided in the vehicle. The pre-crash systems and the at least one collision protection device 221 are, for example, irreversible and reversible crash structures, airbags or also actuators which are activated in the event of collisions in order to protect occupants and/or pedestrians. It is also provided, in particular, that pre-crash systems or collision protection devices 221 are able to be activated or ignited [at] the instant of a collision for increased protection.

If an intersection accident occurs in which, for example, two vehicles such as vehicle 120 and other vehicle 110 crash at an intersection or a road junction, then the following collision characteristics, for instance, are compiled using sensor data: the speed of vehicle 120; the deceleration of vehicle 120 before and/or after the collision; the angle and/or position in the intersection prior to/following the collision or the angular change or offset of vehicle 120; information from passive safety sensors or acceleration sensors, pressure sensors and the like with respect to the location where an impact on the own vehicle or vehicle 120 took place, at which angle the impact on vehicle 120 took place, at which speed the impact on vehicle 120 occurred, etc. The collision characteristics are linked with position data or GPS coordinates, similar to the way it is done in an e-Call system, and transmitted via a data interface or transceiver device 133 to administration device 100 or a Cloud server. In administration device 100, the data are linked with information regarding the weather, road condition such as construction work, and the temperature and/or the like, for example.

Via a number or sum of collisions or accidents at a particular position, e.g., in a certain region such as an intersection or road junction, a Cloud-based database with the aforementioned information is generated per collision in administration device 100. This creates a database in connection with accidents at at least one geographical position. Each compiled parameter, for example, is weighted with probabilities, especially a collision data set or a combination of the parameters per collision. This produces a Cloud-based accident data statistic in administration device 100.

An intersection assistant in vehicle 220 detects a danger of an imminent collision and a speed of other vehicle 210 in the approach of other vehicle 210, for instance laterally in relation to vehicle 220. The intersection assistant is able to issue a warning to occupants of vehicle 220. However, according to exemplary embodiments of the present invention, a linkage with the collision data sets or the Cloud-based accident data statistics, and a measurement of the sensor system of the intersection assistant may take place as well. In this way, a probable impact and a severity of the impact are able to be predicted in a Cloud-based manner via a multitude of data or statistics. Depending on the Cloud-based collision data sets, available pre-crash systems or collision protection devices 221 are able to preadjust the, in all likelihood, most optimal protective measures or to optimally adjust them to the imminent collision with a very high probability, such as with regard to the angle, speed, decelerations, etc.

The method thereby improves the pre-crash measures of vehicles using at least one of the aforementioned features. Vehicles without intersection assistant, but equipped with collision protection device 221 may access the collision data sets in administration device 100 also in a preventive manner and, for example, preadjust collision protection device 221 when encountering especially dangerous road sections, even if no immediate danger is detected. It is furthermore possible, for example, to make the Cloud-based accident data available to governments or traffic authorities so that constructive optimizations or improvements can be undertaken.

The exemplary embodiments described and shown in the figures have been selected merely as examples. Different exemplary embodiments are combinable with one another, either completely or with regard to individual features. An exemplary embodiment may also be supplemented by features from another exemplary embodiment. Furthermore, method steps may be carried out repeatedly and also performed in a sequence other than the one described.

What is claimed is:

1. A method for supplying a collision signal pertaining to a vehicle collision which has occurred, comprising:
generating, by at least one crashed vehicle, a collision signal representing (i) at least one characteristic of a collision involving the at least one crashed vehicle and (ii) position data of the collision, using sensor data of the at least one crashed vehicle pertaining to the vehicle collision which has occurred;
outputting, by the at least one crashed vehicle, the collision signal via an interface to a central collision data administration device;
reading in the collision signal at the central collision data administration device; and
storing a server-stored collision data set which is made available to selected vehicles, based on the read-in collision signal.

2. The method as recited in claim 1, wherein in the step of generating, the collision signal is generated using sensor data representing:
(a) at least one of (i) a speed of the crashed vehicle, and (ii) an acceleration of the crashed vehicle; and
(b) at least one of (iii) an orientation of the crashed vehicle in relation to a road, (iv) a geographical position of the crashed vehicle, (v) an impact position of the crashed vehicle, and (vi) an impact angle of the crashed vehicle.

3. The method as recited in claim 1, further comprising:
combining the read-in collision signal with at least one of an item of surroundings information of the collision and an evaluation parameter for the collision.

4. The method as recited in claim 3, wherein the step of reading in and the step of storing are executed multiple times in order to read in a plurality of collision signals and to store at least one collision data set.

5. The method as recited in claim 4, wherein in the step of storing, a first collision signal and a second collision signal are combined in order to generate a shared collision data set if the first and second collision signals share at least one of matching position data of the collision and matching characteristic of the collision.

6. The method as recited in claim 1, further comprising:
a step of supplying a collision data set for transmission via an interface to at least one receiving device on a second vehicle not involved in the crash, in response to a retrieval signal of the at least one receiving device on the second vehicle.

7. A method for controlling at least one collision protection device of a controlled vehicle not involved in a collision, comprising:
retrieving a collision data set representing (i) at least one characteristic of a collision involving the at least one crashed vehicle and (ii) position data of the collision, for current position data of the controlled vehicle not involved in the collision; and
generating at least one adjustment parameter for controlling the at least one collision protection device of the controlled vehicle not involved in the collision, using the retrieved collision data set.

8. The method as recited in claim 7, wherein the at least one adjustment parameter is used to induce a preadjustment of the at least one collision protection device with regard to the at least one characteristic of the collision from the retrieved collision data set.

9. The method as recited in claim 7, wherein the at least one adjustment parameter is used to induce an output of a warning signal to occupants of the vehicle with regard to a collision danger at a position designated by the position data from the collision data set.

10. A system for supplying a collision signal pertaining to a vehicle collision which has occurred, comprising:
a collision-signal generating device in at least one crashed vehicle for generating a collision signal representing (i) at least one characteristic of a collision involving the at least one crashed vehicle and (ii) position data of the collision, using sensor data of the at least one crashed vehicle pertaining to the vehicle collision which has occurred;
an output device in the at least one crashed vehicle outputting the collision signal via an interface to a central collision data administration device;
a reading-in device at the central collision data administration device for reading in the collision signal; and
a storage device for storing a server-stored collision data set which is made available to selected vehicles, based on the read-in collision signal.

11. A device for controlling at least one collision protection device of a controlled vehicle not involved in a collision, comprising:
a retrieval device retrieving a collision data set representing (i) at least one characteristic of a collision involving the at least one crashed vehicle and (ii) position data of the collision, for current position data of the controlled vehicle not involved in the collision; and
an adjustment-parameter generating device which generates at least one adjustment parameter for controlling the at least one collision protection device of the controlled vehicle not involved in the collision, using the retrieved collision data set.

12. A non-transitory computer-readable data storage medium storing a computer program having program codes which, when executed on a computer, perform a method for controlling at least one collision protection device of a controlled vehicle not involved in a collision, the method comprising:
retrieving a collision data set representing (i) at least one characteristic of a collision involving the at least one crashed vehicle and (ii) position data of the collision, for current position data of the controlled vehicle not involved in the collision; and
generating at least one adjustment parameter for controlling the at least one collision protection device of the controlled vehicle not involved in the collision, using the retrieved collision data set.

* * * * *